United States Patent [19]

Hölzer

[11] Patent Number: 4,750,747

[45] Date of Patent: Jun. 14, 1988

[54] SEAL RING HAVING LUBRICANT POCKETS AND A PROCESS OF MAKING A SEAL RING

[75] Inventor: Helmut Hölzer, Weinheim, Fed. Rep. of Germany

[73] Assignee: Firma Carl Freudenberg, Weinheim/Bergstr., Fed. Rep. of Germany

[21] Appl. No.: 880,133

[22] Filed: Jun. 30, 1986

[30] Foreign Application Priority Data

Jul. 24, 1985 [DE] Fed. Rep. of Germany ....... 3526424

[51] Int. Cl.⁴ .................. F16J 15/32; B32B 31/04
[52] U.S. Cl. ..................... 277/134; 29/428; 29/446; 156/293; 277/1; 277/153; 277/213
[58] Field of Search ............ 277/1, 134, 9, 152, 277/153, 213, 35, 68; 156/293; 29/428, 446

[56] References Cited

U.S. PATENT DOCUMENTS

| | | | |
|---|---|---|---|
| 2,162,104 | 6/1939 | Mosher | 277/153 |
| 3,272,519 | 9/1966 | Voitik | 277/9 X |
| 3,464,709 | 9/1969 | Furgason et al. | 277/213 |
| 3,515,395 | 6/1970 | Weinand | 277/134 |
| 4,155,560 | 5/1979 | Repella | 277/153 |
| 4,167,981 | 9/1979 | Bertin | 277/152 |
| 4,350,347 | 9/1982 | Heinrich | 277/134 X |
| 4,427,205 | 1/1984 | Holzer et al. | 277/134 |

FOREIGN PATENT DOCUMENTS

| | | | |
|---|---|---|---|
| 1338110 | 8/1963 | France | 277/152 |
| 131957 | 6/1951 | Sweden | 277/134 |
| 906366 | 9/1962 | United Kingdom | 277/153 |
| 1196451 | 6/1970 | United Kingdom | 277/134 |

*Primary Examiner*—Allan N. Shoap
*Attorney, Agent, or Firm*—Felfe & Lynch

[57] ABSTRACT

A process of making a seal ring uses an elastic ring having a sealing lip projecting laterally or inwardly about one, innermost edge. The elastic ring is turned inside out so that the one, sealing-lip edge is then outermost before or during fixedly sealing the sealing lip to a supporting ring, the sealing lip having a thin thickness profile effective in this for upsetting the sealing lip. Turning the lipped, elastic ring inside out also crimps a sealing surface of the lipped, elastic ring, which ring bends to engage a shaft axially with the sealing surface, such that lubricant pockets opening from the sealing surface only to the other, free edge of the lipped, elastic ring are uniformly distributed therein circumferentially about the sealing surface. The baffle or side and bottom surface portions of each lubricant pocket merge evenly with each other to form a single ground surface. The baffle surface portions of each lubricant pocket form an obtuse included angle with the adjacent portions of the sealing surface and the bottom surface portion of each lubricant pocket forms an obtuse included angle with the adjacent sealing surface, opening toward the other, free edge of the lipped, elastic ring.

4 Claims, 1 Drawing Sheet

SEAL RING HAVING LUBRICANT POCKETS AND A PROCESS OF MAKING A SEAL RING

BACKGROUND OF THE INVENTION

The invention relates to a seal ring for sealing about a relatively-rotatable shaft and, more particularly, such a seal ring having lubricant pockets and a process of making it.

A known seal ring has a supporting ring to be held about a relatively-rotatable shaft. An elastic ring is fixed at one, lipped edge to the supporting ring in a leak-proof, non-rotating manner, initially to project radially inward therefrom, and then to bend to engage the shaft resiliently and substantially axially with a sealing surface adjacent the other, free edge of the elastic ring. The sealing surface is interrupted at the other, free edge of the elastic ring which, in use, faces a lubricant-containing space that is to be sealed by lubricant pockets.

The lubricant pockets open from the sealing surface only in the direction of the other, free edge of the elastic ring to maintain the sealing function of the sealing surface. In the position of use described, when the sealing surface is substantially axial of the shaft, the lubricant pockets are defined radially by circumferential, bottom surfaces and circumferentially by baffle, side surfaces at least one of which is at an obtuse, included angle in the lipped, elastic ring to the adjacent sealing surface of the lipped, elastic ring and an acute angle to the axis of the ring to be at acute angles to the surface of the shaft and to its rotational axis.

Published European patent application No. 33 963 discloses a seal ring of the type described above. The bottom surfaces of its lubricant pockets have an unvarying distance from the shaft and are delimited from the baffle surfaces of the lubricating pockets by sharp edges. The baffle surfaces are in the form of ribs extending parallel to one another at the same angle to the surface of the shaft in all areas. The hydrodynamic effectiveness of the baffle surfaces is, therefore, dependent on the sealed shaft's turning in a certain direction at a very specific rotary speed. Departures therefrom, consequently, always impair of the sealing action of the seal ring, by increased wear and/or increased leakage, for example.

The lipped, elastic ring having the lubricant pockets can be made by pressing or injection-molding processes. In some cases, it is possible to join it to the supporting ring simultaneously, but this may be uneconomic.

German Federal Patent publication No. 32 46 152 describes another known process for making such a seal ring. In it, a tubular sleeve is cut from a previously-produced and fully-vulcanized tube for use as the lipped, elastic ring. For producing a flange-like supporting ring on the lipped edge of the elastic ring, the lipped edge is pushed onto a mandrel of continuously increasing diameter. Fixing the flange or supporting ring thereto can then be done very quickly in the course of a process that can be substantially automated. Difficulties are then encountered, however, in the creation of hydrodynamically-acting pump-back elements on the sealing surface of the lipped elastic ring.

It is known to produce such hydrodynamically-acting pump-back elements by grinding or pressing recesses into the sealing surface of the elastic ring. These operations involve mechanically working the sealing surface, however, and this is not only extremely expensive, but also problematical because even the slightest differences in the shape or form of the individual pump-back elements will result in decidely different hydrodynamic action and, usually, poorer sealing.

SUMMARY OF THE INVENTION

An object of the invention is, therefore, to improve the sealing action of a seal ring of the type first described above for sealing radially about a shaft regardless of the direction and speed of rotation of the shaft relative to the seal ring.

Another object of the invention to improve the process of making a seal ring such that hydrodynamically-acting pump-back elements are obtained on the sealing surface of an elastic ring for a seal ring without the above-described disadvantages.

These and other objects are achieved, according to the invention, with a seal ring of the type described above having an elastic ring sealingly and non-rotatingly fixed at one, lipped edge to a supporting ring for projecting radially and bendably to the other, free edge of the elastic ring. A sealing surface of the lipped, elastic ring adjacent the other, free edge thereof can then resiliently and sealingly engage a relatively-rotatable shaft substantially axially when the shaft projects through or about the seal ring in use. Lubricant pockets extend into the lipped, elastic ring from an end opening at the free edge of the lipped, elastic ring at least to and, preferably, partly across the adjacent sealing surface of the lipped, elastic ring, but do not cross the sealing surface to open at the other side thereof.

The bottom surface of each lubricant pocket which is innermost in the elastic ring and, in use, circumferential of the shaft and the baffle surfaces of each lubricant pocket which extend from the bottom surface to the sealing surface of the elastic ring merge uniformly with one another. They thus form, together, a single ground surface. The depth and width of each ground surface into the lipped, elastic ring to the bottom surface portion thereof and between the baffle surface portions increases in the direction of the free edge of the elastic ring where each lubricant pocket opens.

The bottom surface portion of the ground surface of each lubricant pocket, i.e. the side of the ground surface opposite the shaft in use, thereof makes an obtuse included angle with the adjacent sealing surface, opening toward the other, free edge of the lipped, elastic ring and thus, in use, an acute angle to the shaft. It can be and, preferably, is defined by a continuously curved section, substantially similar into a conical surface. The cone-like bottom surface portion has a radius of the curvature which, preferably, is smaller than that of the sealed shaft. Its axis of revolution is at an acute angle to the axis of the sealed shaft, in use.

The baffle surface portions of the ground surface of each lubricant pocket, i.e. the sides of the ground surface which engage the shaft at the sealing surface in use, increasingly open, symmetrically, toward the free edge of the elastic ring at complementary acute angles to the axis of the elastic ring and, thus, in use, the shaft. The baffle surface portions of the ground surface of each lubricant pocket also make complementary obtuse included angles with the adjacent sealing surface of the lipped, elastic ring to be, in use, at acute angles to the surface of the shaft. The free edge of the elastic ring and, thus, the opening into each lubricant pocket thereat is at a sealed, lubricant-containing chamber, in use.

As a result, the lubricant volume contained in the lubricant pockets varies independently of the direction of rotation of the sealed shaft, in dependence only on the rotational speed thereof.

The variation in the lubricant volume in the lubricant pockets is characterized by a larger volume of lubricant in the lubricant pockets at low rotational speed of the sealed shaft relative to the seal ring than at high relative rotational speed. Hydrodynamically, therefore, the greater volume of lubricant in the lubricant pockets at low-speed relative rotation is able to lubricate the sealing surface as reliably as the smaller volume of lubricant at higher speeds because, at higher speeds, the lubricant is under higher pressure.

Preferably, the baffle surface portions of the ground surface of each lubricant pocket make a smooth transition, i.e. merge uniformly, into the adjacent sealing surface. This prevents any interruption of lubricant flow under normal operating conditions and substantially aids in achieving good sealing action.

Preferably, too, the baffle surface portions of the ground surfaces of adjacent lubricant pockets merge uniformly with one another, circumferentially about the shaft, in use. This makes it possible to distribute the hydrodynamic forces produced in the lubricant pockets under operating, shaft-rotating conditions in an especially uniform manner. The attainment of wear-free sealing action is thereby facilitated.

Indeed, a preferred seal ring according to the invention makes it possible to seal higher pressures in a virtually wear-free manner regardless of the direction and speed of relative rotation of the sealed shaft than heretofore. It is, therefore, excellently suited for problem applications.

The lipped, elastic ring of the seal ring can be produced by known pressing or injection molding processes, in ready-to-use form in some cases, and in the same operation, joined integrally to the supporting ring, for example by inserting the supporting ring into the injection mold. In the latter case, vulcanizable materials are usually used to make the rings, the materials being fully vulcanized during the molding operation. The time required for this may be so considerable, however, as to impair the economic practicality of the process.

This problem is solved, according to the process of the invention by providing a sealing lip integrally about one, innermost edge of an elastic ring, the sealing lip having a profile effectively-thinner in cross section across the thickness of the lipped elastic ring than the lipped, elastic ring. The inside diameter of the then-innermost sealing lip is greater than the outside diameter of the shaft about which the elastic ring is to seal, in use. The thin profile of the sealing lip then extends laterally and/or inwardly from the corresponding, thickness profile of the lipped, elastic ring. Before or during fixation of the sealing lip of the lipped, elastic ring to the supporting ring, the profile of the lipped, elastic ring is turned inside out such that the inside diameter of the lipped, elastic ring is then smaller than the diameter of the shaft that is to be sealed and the formerly-innermost, sealing-lip edge of the elastic ring is outermost.

The lipped, elastic ring with the annular, integral sealing lip and the supporting ring can be made as separate parts, individually produced in rotationally symmetrical form. The production both the lipped, elastic and supporting rings is thus greatly simplified, and this assures maximum continuity of their dimensions and properties, like elasticity, about their entire circumferences.

Because the sealing lip initially extends laterally and/or inwardly from the innermost edge of the lipped, elastic ring, its thin profile is effective in turning the lipped, elastic ring inside out before or during the fixation of the lipped, elastic ring to the supporting ring and upsetting the sealing lip circumferentially in the radial direction for sealing about the supporting ring.

Because the lipped, elastic ring is thicker than its sealing lip, turning the lipped, elastic ring also results in a crimping of the lipped, elastic ring that becomes increasingly pronounced with increasing distance from the then-outermost sealing-lip edge of the lipped, elastic ring. As a consequence of this crimping, when the seal ring is coaxially about the shaft to be sealed, its lipped, elastic ring continuously engages about the entire circumference of the shaft with an annular, sealing surface between the edges of only the lipped, elastic ring but, on the side of the sealing surface farther from the sealing-lip edge of the lipped, elastic ring and closer to the other, free edge thereof, the contact of the sealing surface with the shaft is interrupted by finger-like undulations of the lipped, elastic ring. The lubricant pockets are between these, established by the crimping, and project to open at the other, free edge of the lipped, elastic ring at the sealed chamber, in use.

The distribution of the finger-like undulations and, thus, the lubricant pockets therebetween circumferentially of the lipped, elastic ring is completely uniform. It is outstandingly advantageous that, if the molecular orientation of the polymeric material of the lipped, elastic ring also runs parallel to the sealing surface of the lipped, elastic ring, it then also follows the undulations of the crimping. This completely equalizes the wear behavior in all portions of the lipped, elastic ring for an especially long useful life.

To produce the crimping, the profile of the sealing lip is to be made as long as practically possible. Preferably, it has a length exceeding its maximum thickness by about 2.5 times. Greater multiples are possible, but usually result in excessively-great intervals between the individual crimps which, in turn, can result in leakage. This disadvantage is often undesirably apparent, especially if the opposite sides of the sealing lip are parallel.

Tapering the profile of the sealing lip toward the other, free end of the lipped, elastic ring at the sealed chamber, in use, is also possible and results in especially-small circumferential intervals between the crimps. The mechanical weakening of the sealing lip that this also produces must be taken into consideration, however, and limits such tapering. The limits are to be determined on an empirical basis.

Because the sealing lip is an integral part of the lipped, elastic ring, only substances of good elasticity can be considered for its manufacture. Rubber-elastic materials are preferred. In some cases, however, after appropriate, empirical testing, polytetrafluoroethylene and polyamide can be considered.

BRIEF DESCRIPTION OF THE DRAWINGS

A preferred embodiment of a seal ring and a preferred process of making it which illustrate but do not limit the invention will now be further explained with the aid of the appended drawings, in which.

DESCRIPTION OF THE PREFERRED EMBODIMENT

Figure 1:
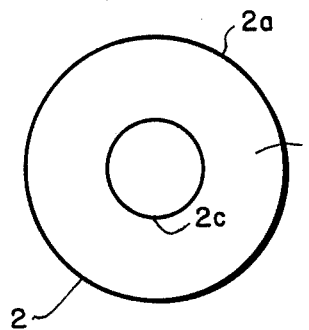
FIG. 1 is a reduced-scale, front elevation of a lipped, elastic ring portion of the preferred embodiment in an initial condition of the preferred process for making the preferred embodiment.

FIG. 1 shows an elastic ring 2 having a sealing lip 2c on one, innermost edge. The inside diameter of the sealing lip 2c is larger than the outside diameter of a shaft S (FIG. 2) about which the elastic ring will seal coaxially when assembled into a seal ring as shown in FIG. 2.

Figure 2:
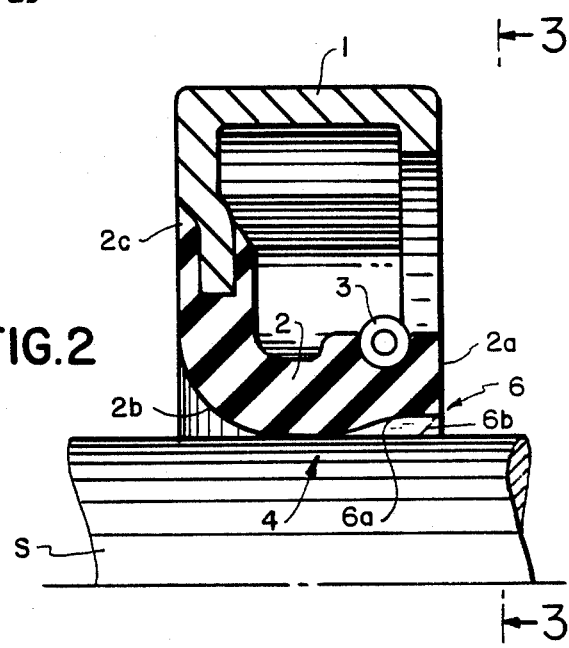
FIG. 2 is a side, sectional elevation of a portion of the preferred embodiment at the end of the preferred process for making it, together with a shaft with which the preferred embodiment is used.

Before or during sealing fixation of the sealing lip 2c of the elastic ring 2 to a supporting ring 1 as shown in FIG. 2, the elastic ring is turned inside out and, therefore, at least when the shaft S is inserted therethrough, assumes the position shown in FIG. 2. In this position, the middle portion 2b of the lipped, elastic ring 2 bends to extend to the other, free, then-innermost edge 2a of the lipped, elastic ring 2 substantially axially of the lipped, elastic ring 2 and shaft S.

The assembled seal ring about the shaft for use as shown in FIG. 2 thus includes the supporting ring 1 which is made of deep-drawn sheet steel and has a limb which projects radially inward to the sealing lip 2c of the lipped, elastic ring 2. The lipped, elastic ring 2 is made of a rubber-elastic material for bendingly projecting substantially axially towards it free edge 2a which, in use, is at a lubricant filled, sealed chamber. In so bending, the lipped, elastic forms a sealing surface at 4 which, at least while the shaft is at a standstill, is resiliently biased into continuous, sealing contact about the shaft by the lipped, elastic ring, preferably aided by an annular coil spring 3 about the lipped, elastic ring near its free edge.

In this position, the sealing surface at 4 has lubricant pockets at 6 which are uniformly distributed about its circumference and open only at the sealed chamber at the free edge 2a of the lipped, elastic ring. Each lubricant pocket is defined, in relation to the surrounding portion of the lipped, elastic ring, by a single, curved ground surface extending inwardly of the surrounding portion of the lipped, elastic ring to a bottom surface portion 6a thereof. The axially successive cross sections of each lubricant pocket in the direction toward the free edge 2a at the sealed chamber enlarge symmetrically. The baffle or side portions 6b defining the ground surface of each lubricant pocket in the circumferential direction are curved oppositely to the middle, bottom portion, so that the ground surface merges uniformly with the sealing surface in this, baffle-surface, circumferential direction.

Figure 3:
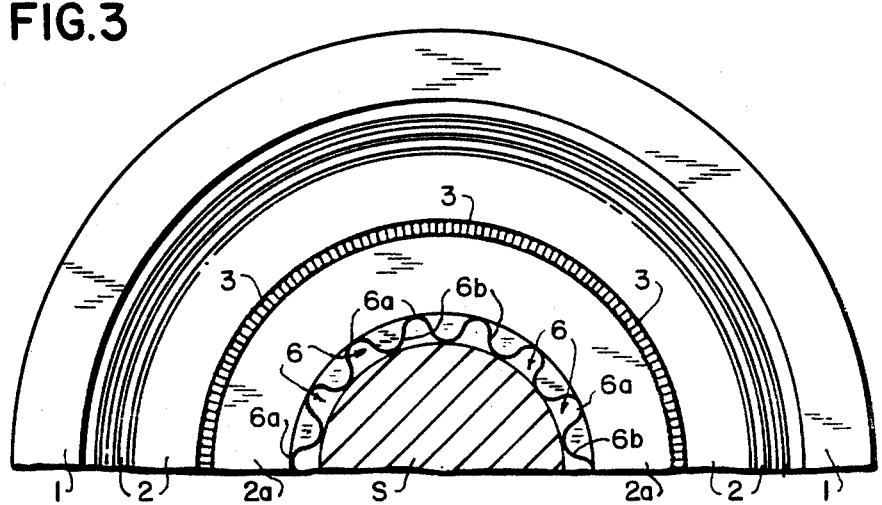
FIG. 3 is a front elevation of the preferred embodiment and shaft for use shown in FIG. 2.

The radius of curvature of both baffle or side portions of the ground surface (both shown in FIG. 3) of each lubricant pocket is approximately identical, and the circumferential distance between adjacent lubricant pockets at 6 is such that no appreciable interruption of the curvature of the baffle or side portions results between them.

The following explanation of operation may now be given:

At low rotary speeds of the shaft S that is to be sealed, the lubricant pockets are filled through their open ends at free edge 2a of the lipped, elastic ring to a high degree with lubricant, e.g., a lubricating oil, from the lubricant-filled, sealed chamber at the free edge. Capillary forces carry the lubricant of the lubricant pockets all the way into even the narrowest spaces between the sealing surface at 4 and the counter-surface of the sealed shaft and, thus, into the zones in which baffle or side portions 6b of the ground surface of each lubricant pocket at 6 of the lipped, elastic ring 2 have the maximum obtuse, included angle in the lipped, elastic ring to the adjacent portion of the lipped, elastic ring, i.e. an acute angle of minimum magnitude to the surface of the shaft.

Even with one turn of the shaft at low rotary speed, in either direction because of the symmetry of the baffle or side portions of the ground surface, the relative rotary velocity builds-up great, radially-outwardly directed forces which lift the sealing surface from the surface of the shaft. Wear is thereby prevented.

Nevertheless, leakage cannot occur, because the bottom surface portion of the ground surface of each lubricant pocket is at an acute angle to the axis of the shaft, opening in the direction of the sealing chamber at the free edge 2a of the lipped, elastic ring. That is, the lubricant pockets end in the sealing surface which seals about the shaft.

Further, a pumping back of lubricant into the sealed chamber at the free edge 2a of the lipped elastic ring from the lubricant pockets with increasing speed of relative shaft rotation also results from the shape of the lubricant pockets. The pumping back increasingly reduces the lubricant volume in the lubricant pockets to compensate for the increasing lifting forces on the sealing surface from the increasing speed of relative shaft rotation. The distance between the sealing surface and the surface of the shaft, which is produced even at relatively-low speeds of relative shaft rotation, as described, is, therefore, maintained even at relatively-high speeds of relative shaft rotation. Wear or leakage are, therefore, not to be expected at either low or high speeds of relative shaft rotation.

It will be understood that the specification and examples are illustrative but not limitative of the present invention and that other embodiments within the spirit and scope of the invention will suggest themselves to those skilled in the art.

What is claimed is:

1. A sealing ring for a shaft having a cylindrical sealing surface, said sealing ring comprising, in combination:

a supporting ring;

an elastomeric ring having two edges, one edge being sealingly and non-rotatably fixed to said supporting ring, said elastomeric ring extending in a substantially axial direction from said one edge to the other edge, said other edge being a free edge;

said elastomeric ring having an inner surface forming a sealing surface adapted to resiliently press against the cylindrical sealing surface of said shaft, thereby delimiting a sealed side of said sealing ring from the side to be sealed, said elastomeric ring having a radial outer surface facing in a direction opposite said inner surface;

said elastomeric ring defining a plurality of lubricant pockets adjacent and between said free edge and said sealing surface on the side to be sealed which are uniformly distributed around the circumference of said elastomeric ring and open only in the direction of said side to be sealed;

each lubricant pocket being delimited by a bottom surface, two baffle surfaces on either side thereof, and an axially extending surface, in contact with said shaft, terminating each baffle surface, said bottom surface forming an acute angle with the axis of said shaft at the end thereof merging with said sealing surface and extending therefrom substantially axially at a radial distance from said shaft toward said free edge, each baffle surface forming an acute angle with said cylindrical sealing surface of said shaft at its associated contact surface, said bottom surface and said baffle surfaces of each lubricant pocket being curved and merging smoothly and uniformly into each other.

2. The sealing ring of claim 1, wherein each baffle surface merges smoothly with said sealing surface of the elastomeric ring.

3. The sealing ring of claim 2, wherein the baffle surfaces of circumferentially adjacent lubricant pockets merge smoothly with each other via said axially extending surface.

4. A process of making a sealing ring, comprising:

providing an elastomeric ring having a sealing lip about one, innermost edge thereof, the sealing lip projecting at least one of laterally and inwardly from the one edge of the elastomeric ring to another edge thereof and having an effectively-thin profile in thickness cross section of the elastomeric ring;

fixedly sealing the sealing lip to a supporting ring; and before fixedly sealing the sealing lip to the supporting ring, turning the elastomeric ring inside out so that the one edge thereof having the sealing lip thereabout is then outermost, the thin profile of the sealing lip being effective in so turning the elastomeric ring for the fixed sealing to the supporting ring, the turning forming an inside surface with a portion of minimum diameter adapted for sealing against an annular counter surface, the elastomeric ring opening toward said other edge thereof, which forms a free edge, the turning also forming lubricant pockets in said inside surface adjacent said sealing surface by crimping the elastomeric ring, said lubricant pockets interrupting said sealing surface on the side facing said free edge and being uniformly distributed around the circumference of said elastomeric ring and open only in the direction of said free edge.

* * * * *